Patented June 30, 1925.

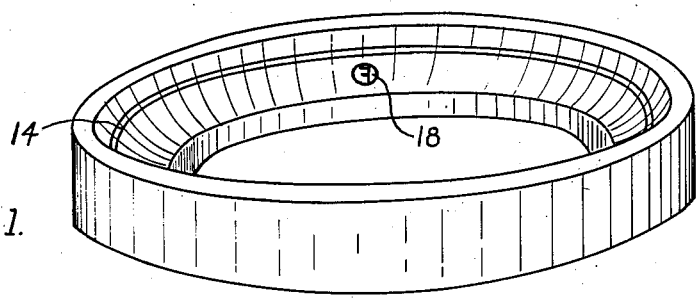
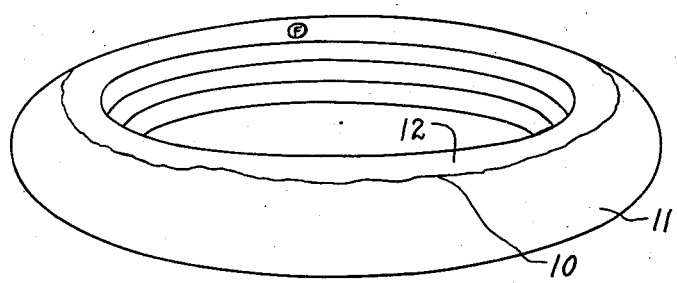
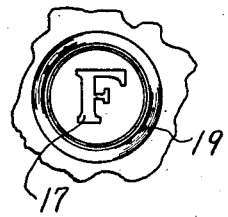
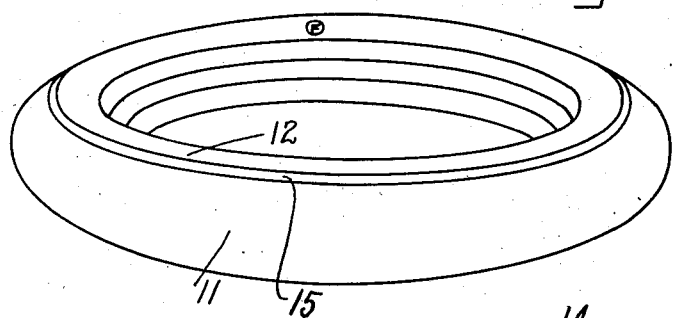
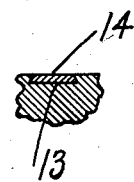
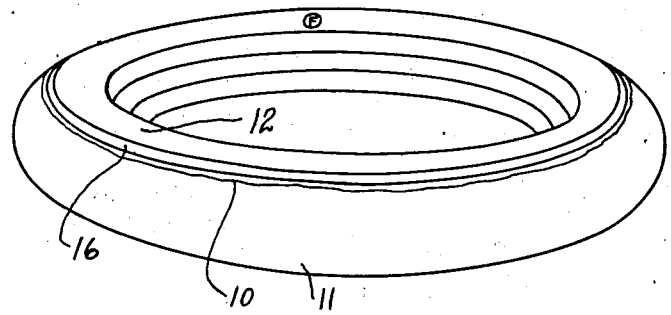

1,544,262

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

MARKING RUBBER.

Application filed March 17, 1923. Serial No. 625,767.

*To all whom it may concern:*

Be it known that I, THOMAS MIDGLEY, a citizen of the United States of America, residing at Hampden, in the county of Hampden and State of Massachusetts, have invented certain new and useful Improvements in Marking Rubber, of which the following is a specification.

This invention relates to methods of marking upon rubber articles. It has for one object the marking of the rubber by a chemical reaction performed during the vulcanization of the rubber. It has for an additional object the marking of rubber in contrasting colors without the necessity of applying pigment to the rubber. It has for a still further object the marking of the rubber without requiring extra handling or treatment of the rubber article, and as an incident to the vulcanizing process.

The invention is practiced by heating the rubber, as for example vulcanizing it, in a mold provided with an insert, in the configuration of the marking desired on the article, composed of some material which will combine with the rubber, or with some ingredient of the compounded rubber. One suitable substance for this purpose is metallic copper, which gives a dark color, of blue-black tinge, to the rubber which is vulcanized in contact with it. The cause of this action is not entirely clear, as the organic chemistry of rubber compounds is not as yet definite. I believe, however, that the reaction which occurs is one involving the copper, rubber, and sulfur with which the rubber is compounded, although it may be between the sulfur and copper only. It has been observed as an interesting scientific phenomenon that there is a migration of copper into a mass of rubber with which the copper remains in contact (Frank and Marckwald, Gummi Zeitung, vol. 28, p. 1280). This is apparently due to some interaction of the copper with the rubber itself. The theory of a copper-rubber reaction is borne out by my experiments in the present case, for while copper, iron, tin, and nickel all give dark colored sulfides, copper alone of these will give a dark color when rubber containing sulfur is vulcanized in contact with it. Slight deposits of iron sulfide occur on iron molds which are repeatedly used, but no appreciable discoloration of the rubber results.

While I believe the reaction to be one embodying a direct interaction between the copper and the rubber molecule, I mention this is a possible explanation of the facts which form the basis of the practically applied method which I have developed, and do not intend to limit this invention in any way by the correctness or incorrectness of my theory.

The invention will now be described in connection with the accompanying drawings, in which Fig. 1 is a perspective of one half of a tire mold;

Fig. 2 is a perspective of a tire as usually constructed;

Fig. 3 is a similar view illustrating one application of the invention;

Fig. 4 is a similar view illustrating another application of the invention;

Fig. 5 is a detail showing one form of marking that may be accomplished by the invention; and Fig. 6 is a sectional detail of a mold adapted for carrying out the invention.

The invention may be applied to various technical uses, among which I have chosen two for illustration. These both relate to the manufacture of vehicle tires, although it must be understood that the invention is in no way limited to such use. The first illustrative example relates to the production of tires built of stocks having different colors, as a black tread and white sidewalls. It is very difficult in the building and vulcanizing operations to preserve the line between the two colors straight and concentric with the body of the tire. Due to irregularities in positioning the stock originally, to distortion in handling, and to uneven flow of the rubber during molding, the line between the two colored stocks is wavy and presents a generally uneven appearance. This detracts from the sales value of the product, and is generally recognized as a disadvantage inherent in the use of two colored stocks, which otherwise gives a product of highly attractive appearance. This uneven condition is indicated by the line 10 in the tire illustrated in Fig. 2, which has a tread 11 and sidewalls 12 of contrasting shades.

The errors of workmanship which normally cause the wavy line 10 can be neutralized and a product obtained having the contrasting shades in truly concentric zones by the treatment which will now be described. In Fig. 1 is shown one half of a tire mold, which may be constructed as usual of iron or steel. Arranged concentrically with the molding surfaces in a groove 13 (Fig. 6) is a band 14 of material, such as copper, which will react with the rubber mixture during vulcanization to produce a dark color. This band is arranged in a proper position to overlap both the tread 11 and the sidewalls 12 when the tire is vulcanized. If now the tire is vulcanized in a mold so constructed a dark band 15 (Fig. 3) will be produced. In the case of the reaction of copper with a mixture of rubber and sulfur this band is of nearly the color of the dark tread, although an exact match is not essential and may indeed be undesired if the whole band is to stand out as a distinct design. This band will, however, be of a solid color, obliterating the original line between the two shades of rubber stock and forming a clearly defined concentric marking. It is of course possible to produce a marking upon a tire according to this method without having the band overlap the two colors (as at 16, Fig. 4), or to produce the concentric band marking upon a tire formed of only one color.

The other illustrative example relates to the formation of marks on tires or other rubber goods for ornamentation or trade-mark purposes. An example of this is shown in the drawings where the letter F (Fig. 5) has been formed in dark color 17 by a copper insert 18 in the mold (Fig. 1). A circle 19 can also be formed around the letter in the same manner. By placing the copper around the letter, instead of forming the letter itself with a copper insert, the letter may be made to stand out in bold relief from a dark background.

Other uses of this invention will suggest themselves in particular cases. It will be observed that no special treatment of either the articles or molds is necessary as successive articles are made, the metallic insert acting repeatedly until it is worn away. At that time it can be readily replaced by a new insert. The copper, as indicated at 14 in Fig. 6, can be conveniently rolled or pressed into a dovetailed or undercut groove 13 in the mold body. Cooper being soft is easily handled, and replacement made easy.

Other material having the same property of changing the color of the rubber during vulcanization may be substituted for the copper. Among these silver may be mentioned, which gives a deep brownish-black color when the rubber is heated in contact with it. It may be found in certain cases, particularly when a long cure is given to the rubber, that the surface of the marked portion has become so hard that checking or cracking of the surface will result. I have found that this result may be avoided by using in place of the active metal, such as copper, an alloy of this with a non-active or less active metal, which probably acts primarily as a diluent. An illustrative alloy for this purpose consists of 88% copper and 12% nickel. Another consists of 95% copper and 2½% each of tin and zinc. Other alloys may be substituted readily, depending upon the dilution of the copper desired.

Vulcanized rubber may be marked or branded in a similar way, the process of vulcanization not being necessary to the success of the marking.

Having thus described my invention, I claim:

1. A process of making rubber vehicle tires which comprises forming the tire with tread sidewalls of stocks of contrasting shades, and heating the tire in contact with a band which overlaps the meeting edges of the two stocks and is composed of a metal such as copper capable of reacting upon the rubber mixture to produce a change of shade therein.

2. A process of making rubber vehicle tires which comprises building up the tire with the tread and sidewalls of stocks of contrasting shades, and subsequently changing the color of a zone overlapping the meeting edges of the two stocks whereby the meeting line is obscured and a sharp line produced between the zone and at least one of the stocks.

3. A process of marking on rubber goods compounded with sulfur which comprises heating the rubber in contact with metallic copper alloyed with some other metal acting as a diluent and a retarder of the action.

THOMAS MIDGLEY.